United States Patent [19]

Chen

[11] Patent Number: 5,400,090
[45] Date of Patent: Mar. 21, 1995

[54] CONNECTING STRUCTURE FOR CONNECTING A GLASSES TEMPLE WITH A GLASSES FRAME

[75] Inventor: Chung-Feng Chen, Taipei, Taiwan, Prov. of China

[73] Assignee: Chau-Chen Industry Co., Ltd., Taipei, Taiwan, Prov. of China

[21] Appl. No.: 174,816

[22] Filed: Dec. 29, 1993

[51] Int. Cl.⁶ .............................................. G02C 5/22
[52] U.S. Cl. .................................. 351/113; 351/153; 16/228
[58] Field of Search ............... 351/111, 113, 121, 140, 351/141, 153; 16/228, 277, 281

[56] References Cited

U.S. PATENT DOCUMENTS

| | | | |
|---|---|---|---|
| 4,617,698 | 10/1986 | Drlik | 351/113 X |
| 4,674,147 | 6/1987 | Drlik | 351/113 X |
| 4,991,258 | 2/1991 | Drlik | 351/113 X |
| 5,165,060 | 11/1992 | Huang | 351/113 |

Primary Examiner—William L. Sikes
Assistant Examiner—David R. Parsons
Attorney, Agent, or Firm—Browdy and Neimark

[57] ABSTRACT

A connecting structure for connecting a glasses temple with a glasses frame is disclosed. The connecting structure includes a hinge means composed of a first hinge member and a second hinge member, a U-shaped resilient member, a compression spring and a rivet pin, wherein the first hinge member is fixed on one side of a glasses frame and pivotally connected with the second hinge member by a screw. The second hinge member is formed with a rear shaft hole and the rivet pin has a head portion and a shaft portion. The U-shaped resilient member has two slightly outward stretched free ends and is disposed at a rear end of the second hinge member. The shaft portion of the rivet pin goes through the compression spring and a through hole of the resilient member into the shaft hole of the second hinge member, whereby the second hinge member associated with the U-shaped resilient member, compression spring and rivet pin is inserted into the tunnel of the glasses temple until the resilient member is located at the receptacle thereof with the resilient member outward stretching and engaging with the receptacle and thus connect the second hinge member with the glasses temple.

1 Claim, 6 Drawing Sheets

CONNECTING STRUCTURE FOR CONNECTING A GLASSES TEMPLE WITH A GLASSES FRAME

BACKGROUND OF THE INVENTION

The present invention relates to a connecting structure for connecting a glasses temple with a glasses frame. The connecting structure permits the glasses temple to be outward over 90 degrees biased without breaking down. Also, by means of the connecting structure, the glasses temple can be easily connected with the glasses frame.

A conventional connecting structure for connecting a glasses temple with a glasses frame is shown in FIG. 1. This connecting structure permits the glasses temple to be outward over 90 degrees biased without breaking down. Such connecting structure includes a first hinge member 11 fixed on the glasses frame, a second hinge member 12 pivotally connected with the first hinge member 11 and formed with a shaft hole 121, a U-shaped member 20 fitted with a rear portion of the second hinge member 12 and formed with a thread hole 21, and a rivet pin 40 having a shaft portion 41 extending through a compression spring 30 into the shaft hole 121 of the second hinge member 12. The second hinge member 12 is punched to fixedly engage with the rivet pin 40 and placed into a tunnel 51 of the glasses temple 50. A screw is screwed into the thread hole 21 of the U-shaped member 20 to secure the second hinge member 12 with the glasses temple 50 and thus connect the glasses temple 50 with the glasses frame.

According to the above arrangements, the thichness of the U-shaped member 20 is not sufficient and the thread hole 21 thereof can include only a few circles of thread. Therefore, in case the screw is over-tightened, the thread may be broken and become useless. In addition, because the U-shaped member 20 is placed in the tunnel 51 of the glasses temple 50, it is difficult to align the screw with the thread hole 21 of the U-shaped member 20 from outside. This causes trouble in assembling operation.

Therefore, it is necessary to provide an improved connecting structure which permits the glasses temple to be outward over 90 degrees biased without breaking down and permits the glasses temple to be easily connected with the glasses frame.

SUMMARY OF THE INVENTION

It is a primary object of the present invention to provide an improved connecting structure for connecting a glasses temple with a glasses frame. The connecting structure includes a first hinge member fixed on the glasses frame, a second hinge member pivotally connected with the first hinge member, a U-shaped resilient member, a compression spring and a rivet pin, wherein the U-shaped resilient member has two slightly outward stretched free ends and when the second hinge member associated with the U-shaped resilient member, compression spring and rivet pin is inserted into a tunnel of the glasses temple, the resilient member is located at a receptacle thereof with the two free ends outward stretching and engaging with the receptacle and thus connect the second hinge member with the glasses temple. Therefore, the glasses temple can be easily firmly connected with the glasses frame.

The present invention can be best understood through the following description and accompanying drawing, wherein:

DETAILED DESCRIPTION OF THE PREFERRED EMBODIMENT

Figure 1:
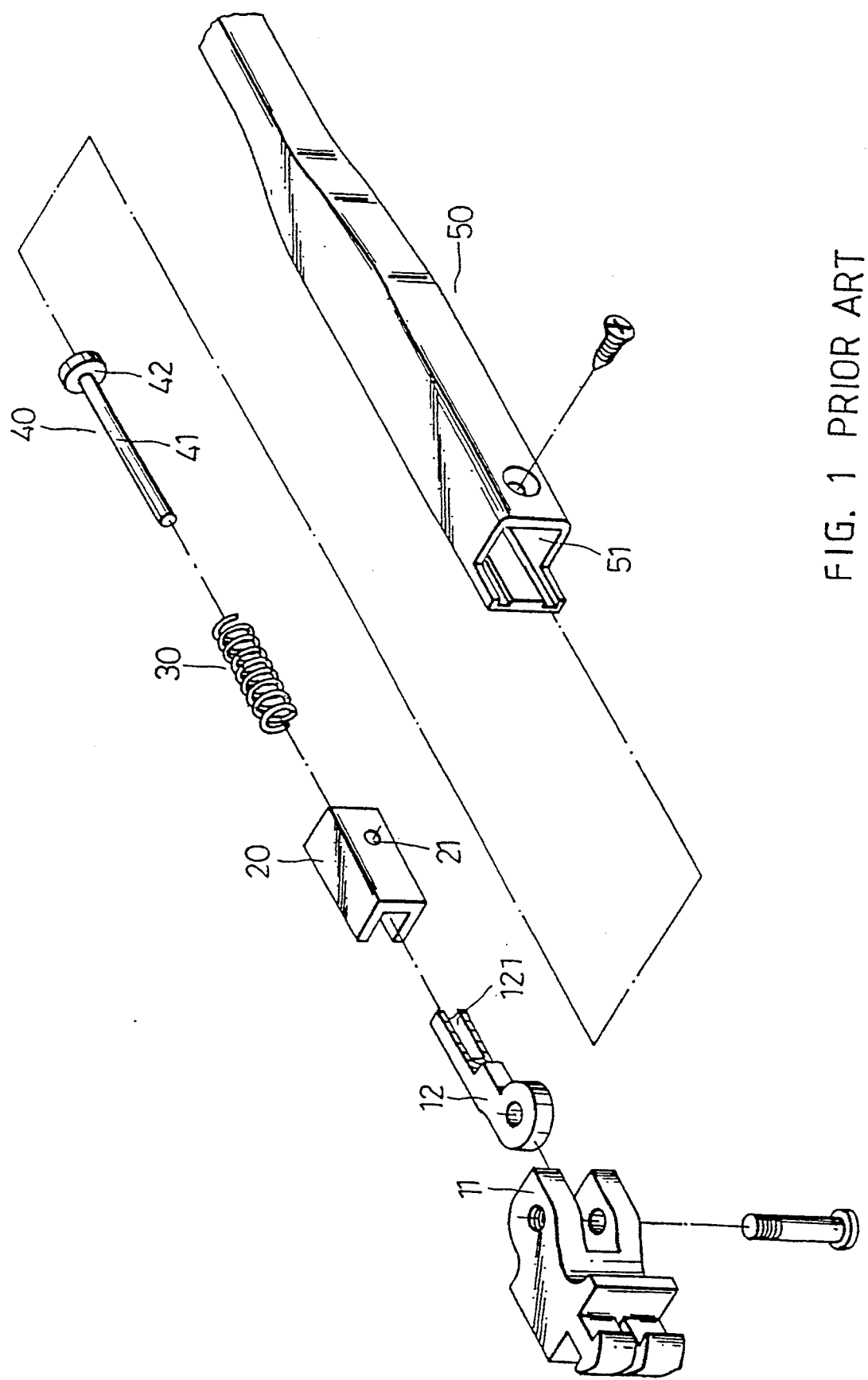
FIG. 1 is a perspective exploded view of a conventional connecting structure for connecting a glasses temple with a glasses frame.
Figure 2:
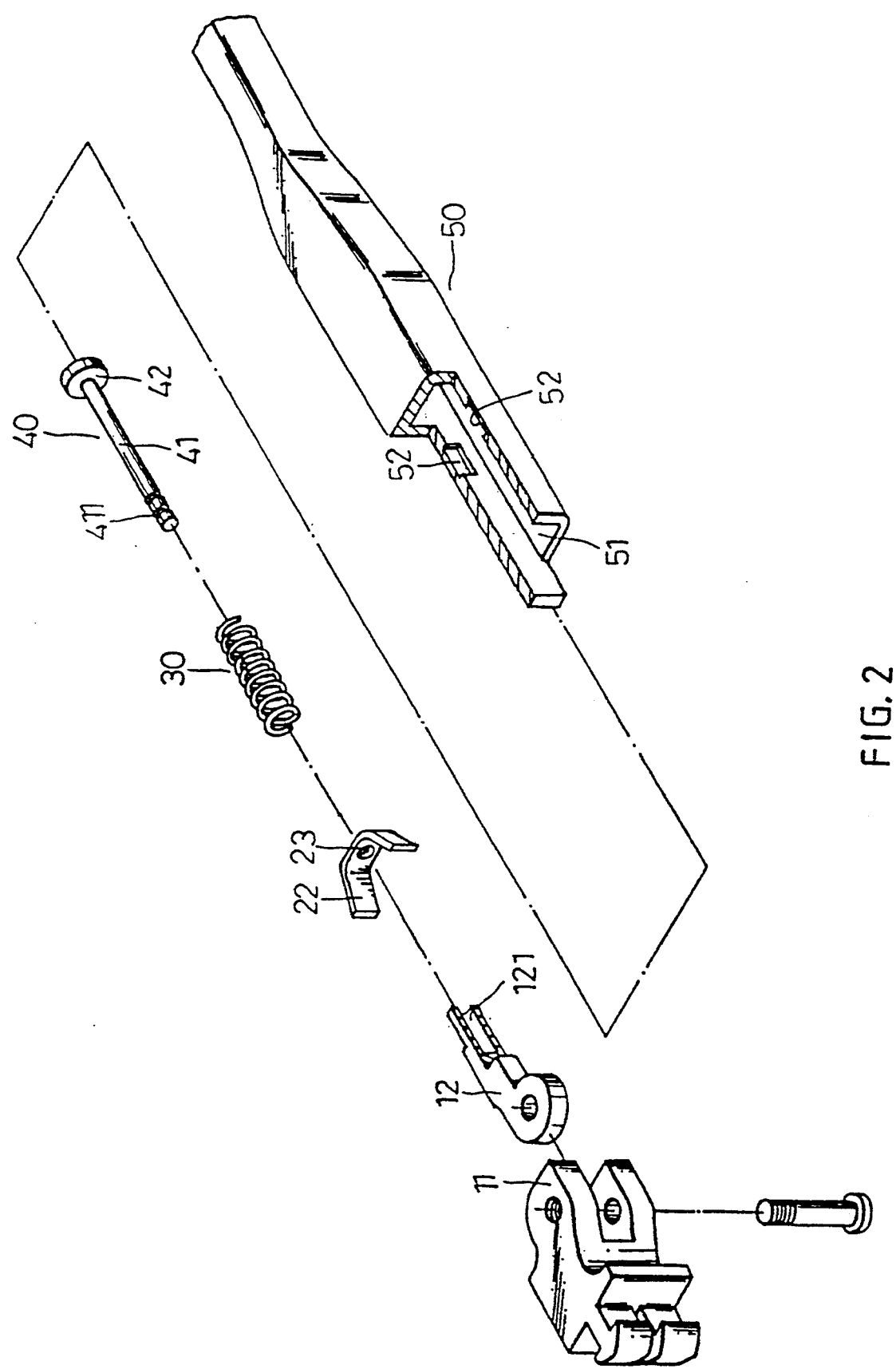
FIG. 2 is a perspective exploded view of the connecting structure for connecting a glasses temple with a glasses frame of the present invention.

Please refer to FIG. 2. The connecting structure of the present invention includes a hinge means composed of a first hinge member 11 and a second hinge member 12, a U-shaped resilient member 22, a compression spring 30 and a rivet pin 40. The first hinge member 11 is fixed on one side of a glasses frame 60 and pivotally connected with the second hinge member 12 by a screw. The first hinge member 11 shown by the left upper portion of FIG. 2 is suitable for a metal glasses frame, while the first hinge member 11 shown by the left lower portion of FIG. 2 is suitable for a plastic glasses frame. The second hinge member 12 is formed with a rear shaft hole 121 and the rivet pin 40 has a head portion 42 and a shaft portion 41 formed with front annular grooves 411.

Figure 3:
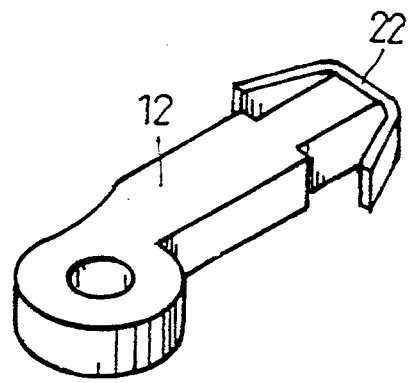
FIG. 3 is a perspective view of the U-shaped resilient member associated with the second hinge member of the present invention.

The U-shaped resilient member 22 has two slightly outward stretched free ends and is disposed at a rear end of the second hinge member 12 as shown in FIG. 3. The U-shaped resilient member 22 has a width larger than that of an insert tunnel 51 of a glasses temple 50, so that when the resilient member 22 is inserted into the tunnel 51, the two free ends of the resilient member 22 are first biased inward and then instantly bound outward at a receptacle 52 to engage therewith.

The compression spring 30 is fitted on the shaft portion 41 of the rivet pin 40 with one end abutting against the head portion 42 of the rivet pin 40 and the other end abutting against the U-shaped resilient member 22.

Figure 4:
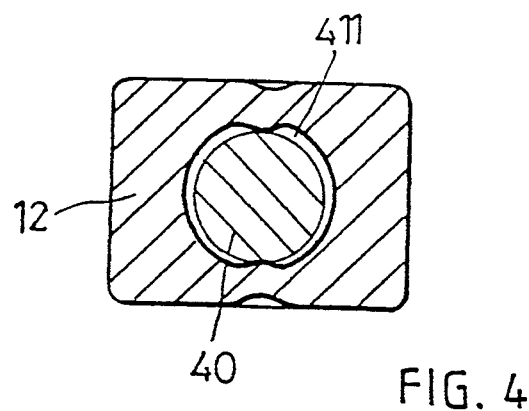
FIG. 4 is a sectional view showing that the rivet pin is associated with the second hinge member by means of punching.

The shaft portion 41 of the rivet pin 40 goes through the compression spring 30 and a through hole 23 of the resilient member 22 into the shaft hole 121 of the second hinge member 12. As shown in FIG. 4, the second hinge member 12 is punched at the position of the annular grooves 411 of the rivet pin 40 to fixedly associate therewith.

Figure 5:
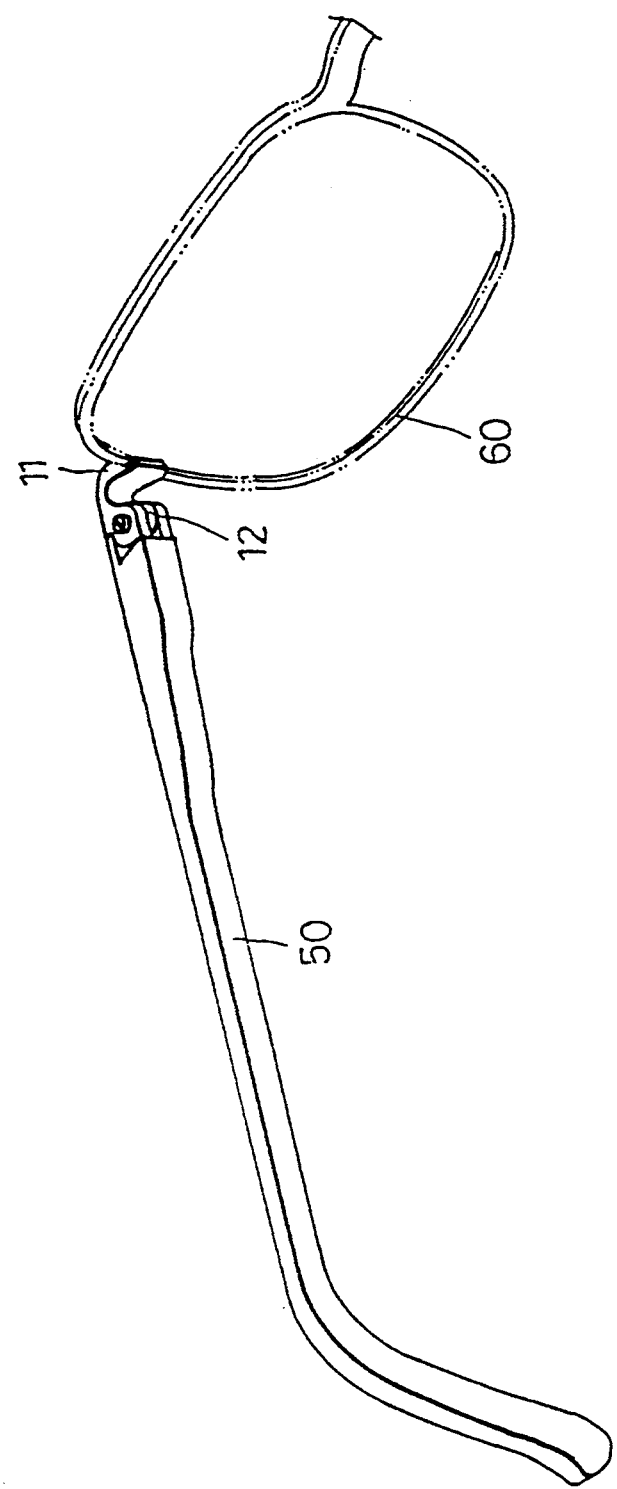
FIG. 5 shows that the connecting structure of the present invention connects a metal glasses temple with a metal glasses frame.
Figure 6:
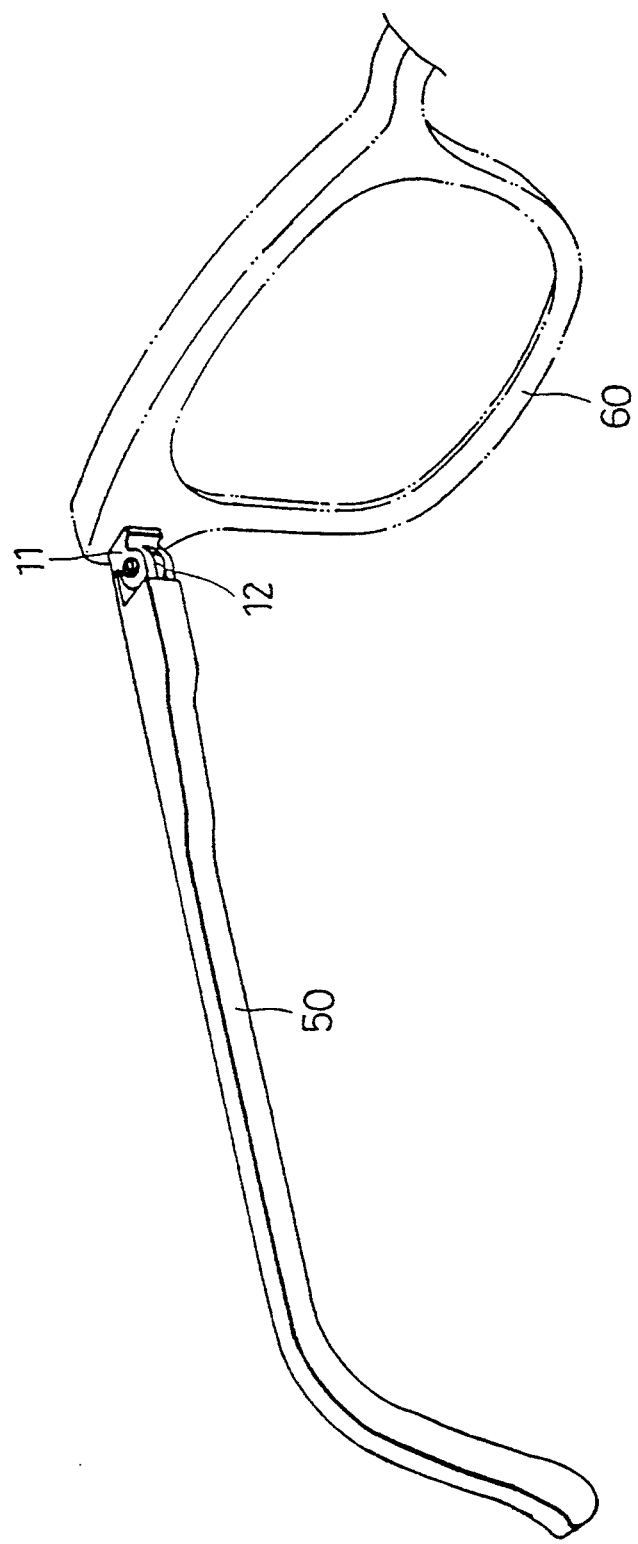
FIG. 6 shows that the connecting structure of the present invention connects a plastic glasses temple with a plastic glasses frame.
Figure 7:
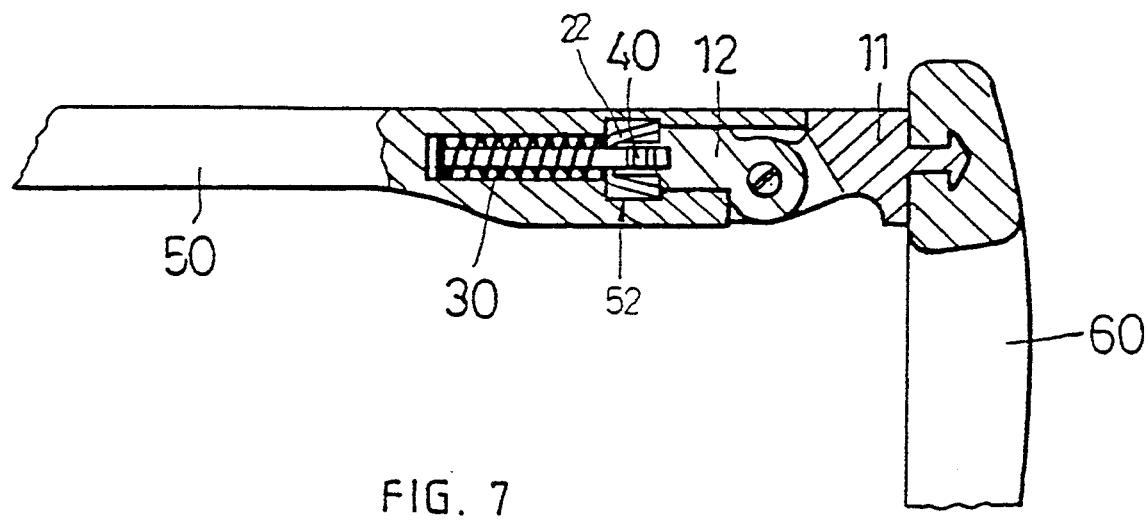
FIG. 7 shows the connecting structure in an unfolded state.
Figure 8:
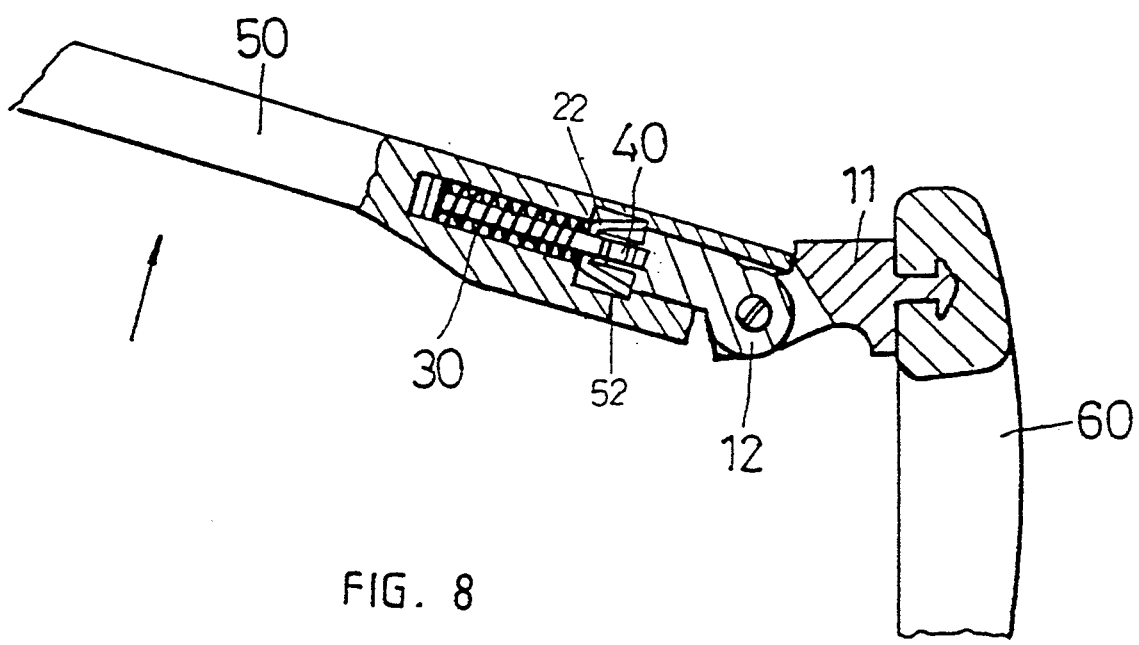
FIG. 8 shows the connecting structure in a folded state.

Please refer to FIGS. 5 and 6. The assembled second hinge member 12, U-shaped resilient member 22, compression spring 30 and rivet pin 40 are inserted into the tunnel 51 of the glasses temple 50 until the resilient member 22 is located at the receptacle 52 thereof. At this time, the resilient member 22 outward stretches to engage with the receptacle 52 and thus connect the second hinge member 12 with the glasses temple 50. Referring to FIGS. 7 and 8, in case the glasses temple 50 is biased outward with the angle contained by the glasses temple 50 and the glasses frame 60 over 90 degrees, the compression spring 30 is resiliently compressed to prevent the glasses temple 50 from being broken down. In addition, because the second hinge member 12 is fixedly associated with the rivet pin 40 by way of punching, the rivet pin 40 will not detach from the second hinge member 12 and thus the glasses temple 50 will not separate from the glasses frame 60.

It is to be understood that the above description and drawings are only used for illustrating one embodiment of the present invention, not intended to limit the scope thereof. Any variation and derivation from the above description and drawings should be included in the scope of the present invention.

What is claimed is:

1. A connecting structure for connecting a glasses temple with a glasses frame, comprising a hinge means composed of a first hinge member and a second hinge member, a U-shaped resilient member, a compression spring and a rivet pin, wherein said first hinge member is fixed on one side of a glasses frame and pivotally connected with said second hinge member by a screw, said second hinge member being formed with a rear shaft hole and said rivet pin having a head portion and a shaft portion formed with front annular grooves, said U-shaped resilient member having two slightly outward stretched free ends and being disposed at a rear end of said second hinge member, said U-shaped resilient member having a width larger than that of an insert tunnel of a glasses temple, so that when said resilient member is inserted into said tunnel, said two free ends of said resilient member are first biased inward and then instantly bound outward at a receptacle of said tunnel to engage therewith, said compression spring being fitted on said shaft portion of said rivet pin with one end abutting against said head portion thereof and the other end abutting against said U-shaped resilient member, said shaft portion of said rivet pin going through said compression spring and a through hole of said resilient member into said shaft hole of said second hinge member, said second hinge member being punched at a position of said annular grooves of said rivet pin to fixedly associate therewith, whereby said second hinge member associated with said U-shaped resilient member, compression spring and rivet pin is inserted into said tunnel of the glasses temple until said resilient member is located at said receptacle thereof with said resilient member outward stretching and engaging with said receptacle and thus connect said second hinge member with the glasses temple.

* * * * *